United States Patent [19]

Warner et al.

[11] Patent Number: 4,789,163
[45] Date of Patent: Dec. 6, 1988

[54] INDOOR HORSESHOE PITCHING GAME

[76] Inventors: Larry W. Warner, 1007 N. Main, Creve Coeur, Ill. 61611; Mark S. Neyrinck, 2100 N. Morton Ave., Mortron, Ill. 61550

[21] Appl. No.: 60,602

[22] Filed: Jun. 11, 1987

[51] Int. Cl.$^4$ ............... A63B 67/06; A63B 71/04; A63F 9/22
[52] U.S. Cl. ............... 273/336; 273/DIG. 28; 273/85 G; 273/1 E; 273/1 M
[58] Field of Search ............... 273/336, 410, 427, 1 E, 273/1 ES, 1 GD, 1 GC, 1 M, DIG. 28, 85 G, 337, 338

[56] References Cited

U.S. PATENT DOCUMENTS

| | | | |
|---|---|---|---|
| 1,997,238 | 4/1935 | Sharp | 273/337 |
| 3,547,442 | 12/1970 | Fenicchia | 273/336 |
| 3,773,330 | 11/1973 | Glass et al. | 273/337 |
| 4,130,281 | 7/1977 | Leber et al. | 273/336 |

Primary Examiner—Leo P. Picard
Assistant Examiner—Jessica J. Harrison
Attorney, Agent, or Firm—Ralph E. Walters

[57] ABSTRACT

The present invention relates to an indoor horseshoe pitching game and is specifically concerned with providing an electronically controlled game which closely simulates the structure and method of play of the traditional outdoor game. Other electronic games such as bowling, darts and the like, utilize playing pieces which have no correspondence whatsoever to the playing pieces used in the original games and have no further correlation with respect to the degree of skill necessary from the original to the simulated game. Serious safety hazards also exist when bringing the outdoor game into the more confined fragile environment of the indoors when the horseshoes employed are of such a shape and form that their bounce or roll cannot be readily predicted upon striking or landing upon any unimproved receiving surface. The present invention overcomes the above deficiencies of the prior art by providing horseshoes and a pit landing area substantially simulating the original configuration of those components and by providing a walled horseshoe receiving pit so as to deflect any errant throws of the shoes to the pit area. Also, every aspect of the game is computer controlled to ensure that the game progresses in an orderly fashion without undue delays and without any cheating by the players. The precise location of each shoe landing upon the floor of the pit is accurately determined and the exact score, if any, achieved by the player is immediately displayed on the monitor screen adjacent the playing area.

10 Claims, 4 Drawing Sheets

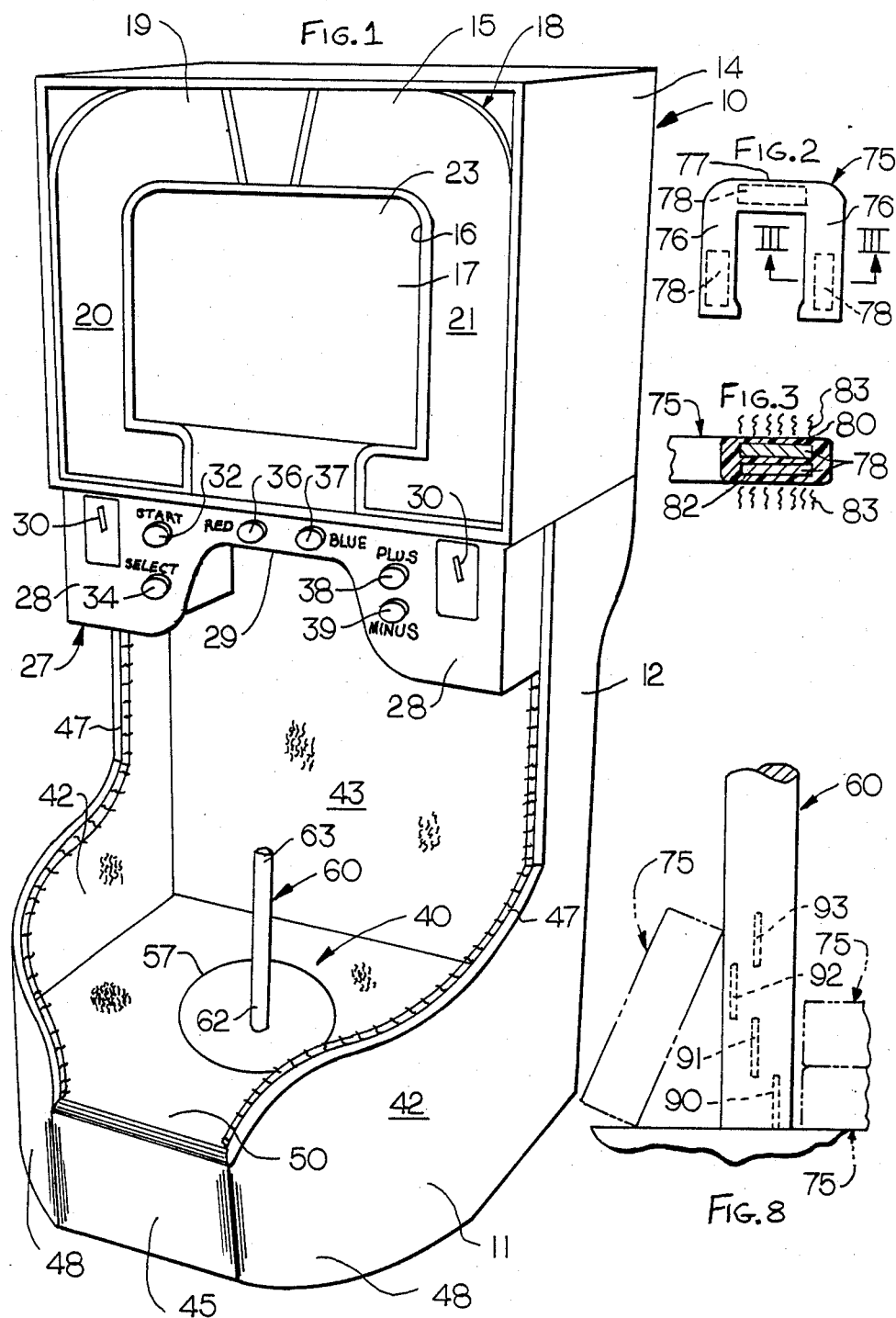

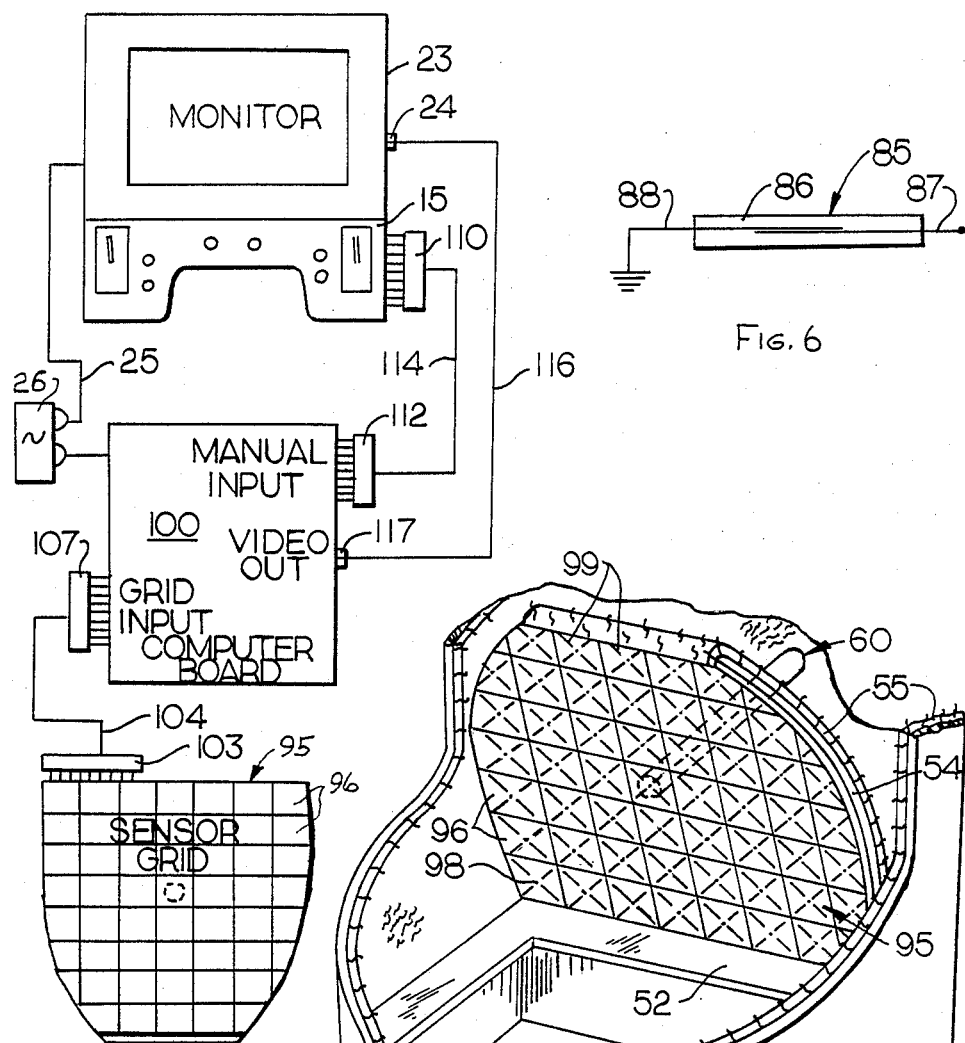
Fig. 6
Fig. 5
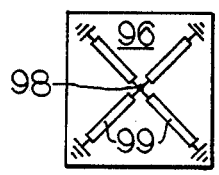
Fig. 7
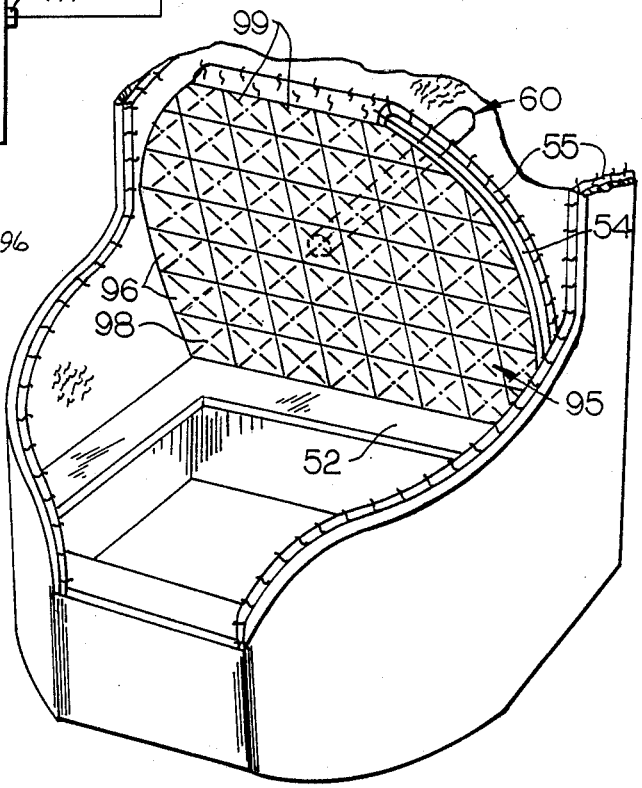
Fig. 4

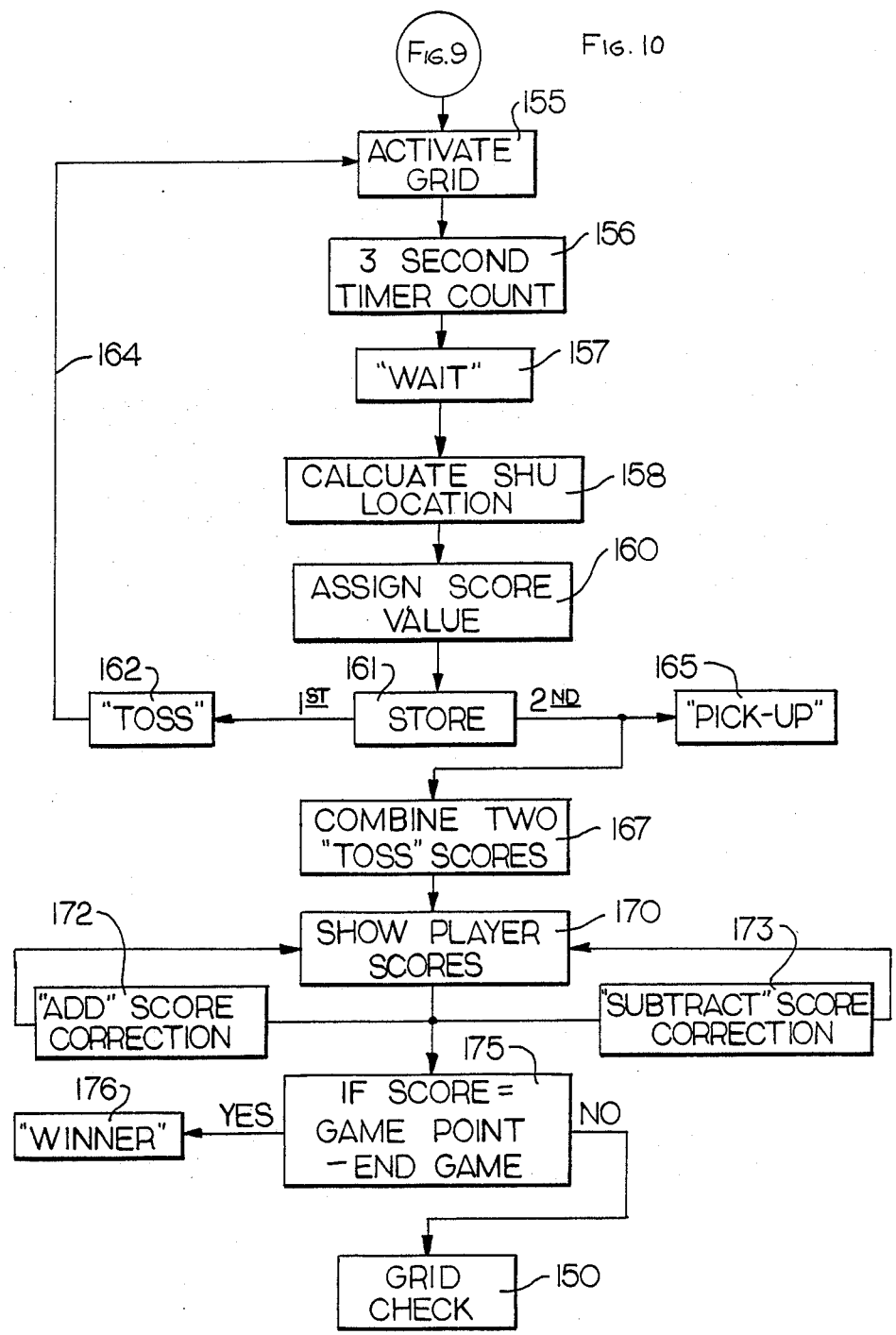

INDOOR HORSESHOE PITCHING GAME

TECHNICAL FIELD

The present invention generally relates to a horseshoe pitching game and more particularly to such a game primarily intended to be played indoors which utilizes electronic programmable circuitry for activating, recording, and displaying the scoring during play.

BACKGROUND ART

Pitching horseshoes has long been a popular outdoor game with the object being to land a pitched horsehose as closely as possible to a post driven into the ground within a target pit area. The optimum toss results in a ringer with the shoe encircling the post for the highest score. Fewer points are scored for a leaner and the smallest amount, or minimum score, being given when the shoe comes to rest within a horseshoe width from the post. The post and shoes are usually constructed of a heavy metallic material wherein an errant toss may create a substantial hazard to the participants as well as to any spectators in the immediate area. Even with a seemingly good or fairly accurate toss, the shoe might skip or flip through the air well beyond the pit area or land on its edge, causing the shoe to roll very rapidly along the ground uncontrollably in any direction, thus constituting an even great hazard to any person or to property in the immediate vicinity. For these reasons the game of horseshoes has not been readily adapted to being played indoors. Even when constructed of a more light-weight plastic material. Most of the same hazards still exist, especially to furniture and other more fragile items usually located indoors.

Other of the more successful indoor electronic games such as bowling and darts, lose something in the transition of converting the game from its original form primarily because they do not duplicate the game projectile sufficiently closely enough to the original for a player to transfer the skills of one to the other. In electronic bowling a metal puck is substituted for the ball, and in darts the projectile has a large magnetized blunt end which is difficult to ensure sticking to the target dart board.

The closest non-electronic indoor game similar to horseshoes which has gained any popularity is the common ring toss game which, however, is played almost exclusively by relatively young children. Because of its lack of sophistication and absence of any great challenge or the need to develop any substantial skills of the type necessary in pitching a more traditionally shaped horseshoe, such attempts at similar indoor games have not met with any great measure of success particularly by older children or adults. Therefore, it is recognized that it would be desirable to develop an indoor electronic horseshoe pitching game which closely simulates as much as possible the original outdoor game but without the aforedescribed safety hazards attendant to moving the original game indoors. Accordingly, the present invention is directed to overcoming the problems as set forth above.

DISCLOSURE OF THE INVENTION

In accordance with one aspect of the present invention, there is provided an indoor horsehose pitching game providing a substantially upright console having a horseshoe receiving pit providing a centrally located goal post upwardly extended therefrom with a plurality of horseshose deflecting walls disposed about the pit to confine errant or off-line throws to the pit area.

In another aspect of the present invention, there is provided a programmable electronic circuit for automatically indicating the position of shoes landing in the pit area relative to the goal post with a television monitor mounted on the console for immediately displaying and totalling the score as the game progresses.

DESCRIPTION OF THE DRAWINGS

FIG. 1 is a three-dimensional view of an upright console for the horseshoe pitching game of the present invention having a partially enclosed target pit area.

FIG. 2 is a top-plan view of a playing piece or shoe having a plurality of magnets disposed therein utilized by the horseshoe pitching game of the present invention.

FIG. 3 is a somewhat enlarged transverse vertically cross sectional view through one leg of the shoe taken along the line III—III of FIG. 2.

FIG. 4 is a fragmentary three-dimensional view of the pit area of the console of FIG. 1 but showing the floor of the pit swung upwardly to show a sensor grid mounted beneath the floor.

FIG. 5 is a schematic diagram of the electronic circuit utilized by the horseshoe pitching game of the present invention.

FIG. 6 is a diagrammatic view of one of the electrical sensors utilized in the present invention.

FIG. 7 is a somewhat enlarged diagrammatic view of a single square of the senosr grid of FIGS. 4 and 5.

FIG. 8 is a somewhat enlarged fragmentary view of the base portion of the goal post having a plurality of sensors for detecting the presence of a shoe closely adjacent to the post.

FIG. 10 is a diagramatic view similar to FIG. 9 showing th remaining steps of operation through the "end game" mode.

BEST MODE OF CARRYING OUT THE INVENTION

Figure 9:
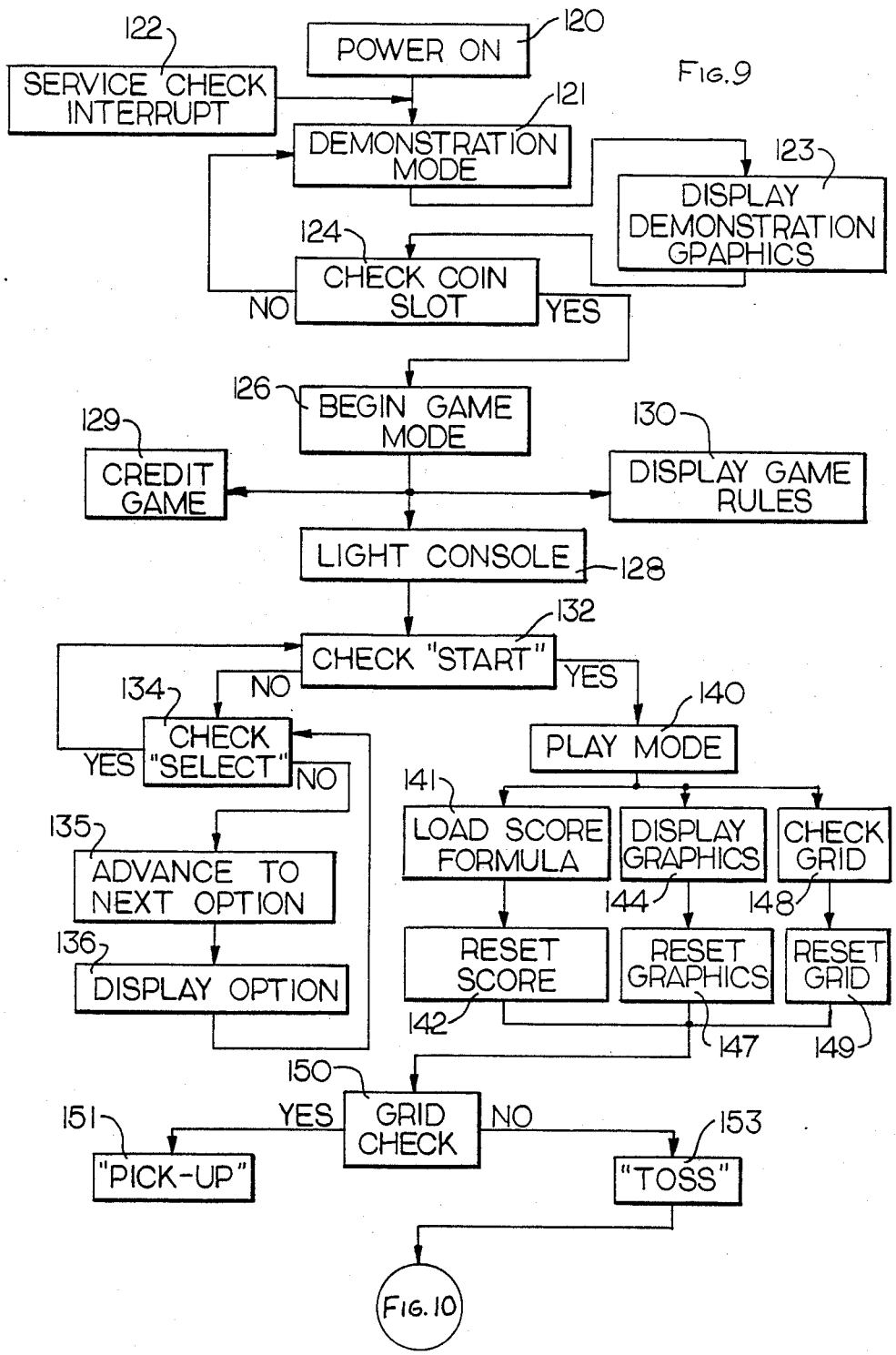
FIG. 9 is a diagramatic view of a flow chart of the operation of the horsehose pitching game of the present invention from the "power on" to the first "grid checks" mode.

Referring more particularly to FIG. 1 of the drawings, an indoor horseshoe pitching game embodying the principles of the present invention provides a substantially upright target console generally indicated by the reference numeral 10. The console includes a lower base 11, an upstanding back 12 and an upper monitor cabinet 14. The cabinet has a front display panel 15 disposed in forwardly, outwardly overhanging relation to the base 11 and includes a substantially rectangular monitor screen opening 16. The display panel is constructed of a sheet of impact resistent safety glass or transparent plexi-glas material. A horeshoe-shaped design 18 is imprinted upon the display panel of the cabinet and has an upper bight portion 19 and opposite side legs 20 and 21. The leg 20 is preferably constructed of a red colored translucent material while the leg 20 is constructed of the same material but of a blue color for representing the colors of the playing teams.

The cabinet 14 of the console 10 includes a rear access door (not shown) to permit the installation of a television monitor 23 within the cabinet with the viewing screen thereof precisely aligned with the opening 16 in the front panel 15 of the cabinet. The monitor has a conventional coaxial cable video input connection 24, and as best shown in FIG. 5, an alternating current inlet power plug line 25 is extended therefrom for connection to an AC current supply junction box 26.

A control panel, generally indicated by the reference numeral 27, is suspended from beneath the overhanging front panel 15 of the cabinet 14 and includes opposite side legs 28 and a center notch 29. A pair of coin slots 30 are disposed on opposite sides of the panel for initiating play of the game. The panel also includes a start button 32, a select button 34, a red player button 36 and a blue player button 37. The control panel also has a plus button 38 and a minus button 39. Each of the coin slots and each of the buttons include a normally open electrical switch, not shown, which are all electrically interconnected for a purpose hereinafter to be discussed.

A partially enclosed horseshoe receiving pit 40 is located on the base 11 of the target console 10. The pit is formed by a plurality of opposite side walls 42, a rear wall 43, and a opposite lower front wall 45. Each of the side walls has an upper edge 47 which extends downwardly from the control panel adjacent to the rear wall 43 and thence forwardly, angularly downwardly toward the front wall 45. The upper edges terminate in spaced relation to each other to form a front opening 50 for the pit to provide substantially unobstructed entry of pitched shoes into the pit 40. As best shown in FIG. 4, a floor support ledge 52 is formed between the side walls 42 as part of the base 11.

A removable floor panel 54 is adapted to be rested upon the ledge 52 and includes an upper substantially flat shoe receiving surface or playing field 55 carpeted with a layer of Astroturf, or the like. A circular scoring circle 57 is centrally disposed on the upper surface 55 of the floor panel 54. A target or goal post 60 is centrally mounted within the scoring circle and has a base 62 rigidly mounted in the floor panel and an opposite upper end 63 substantially vertically upwardly extended therefrom.

A plurality of horseshoes or projectiles 75 are provided for throwing into the pit 40. As best shown in FIG. 2, each shoe is constructed of a molded plastic material and has a pair of opposite legs 76 continuously interconnected by a bight portion 77. A plurality of sets of pairs of permanent magnets 78 having substantially flat upper and lower planar surfaces 80 and 82, respectively, are molded into the shoe in relatively closely spaced substantially parallel relation to each other. The surfaces are oppositely polarized with the south polarized lower planar surface 82 of one lying adjacent to the north polarized upper planar surface 80 of the other. With this arrangement, a uniformly perpendicularly outwardly extended magnetic field 83 is generated from either side of the shoe.

As best shown in FIG. 8, the goal post 60 within the pit 40 has a plurality of electrical sensors consisting of a standard reed-type relay switch, generally indicated by the reference numeral 85, molded within the base portion 62 thereof. As more specifically shown in FIG. 6, each of the sensors 85 is constructed of an elongated cylindrical glass tube 86 having a positive lead 87 extending inwardly from one end thereof and an opposite negative or ground lead 88 extended inwardly from the opposite end. The leads are normally spaced from each other as shown and are activated in a manner to be drawn into intimate contact by the presence of the magnetic field 83 generated by the magnets 78 within the shoes 75. The four sensors 85 are arranged in a spiralling upwardly extending pattern from the floor of the pit to provide a first lowermost sensor 90, a second sensor 91, a third sensor 92, and a fourth or uppermost sensor 93.

The position of the shoes 75 in the pit 40 are determined by a plastic sensor panel 95 which is mounted on the lower side of the floor panel 54. As best shown in FIG. 4, the sensor panel is divided into a plurality of shoe sensing squares or spaces 96 forming a grid pattern completely covering the floor of the pit. The grid spaces individually provide a centrally disposed electrical connection 98 for a plurality of sensor switches 99 substantially identical to the sensor switches 85 in the goal post. Preferably there are four sensor swtiches extending into each corner of the grid spaces 96 as shown in FIG. 7. Each of their positive leads 87 are connected to the center connection 98 and each of their negative leads 88 to a ground. All the center connections 98 are interconnected throughout the sensor panel 75. It will be noted that several of the peripherally disposed grid spaces are somewhat triangular in configuration and will only accommodate three of the sensor switches 99.

The electronic circuitry employed for controlling the ooeration of the horseshoe pitching game of the present invention is shown in FIG. 5. The heart of the circuitry provides a computer board 100 which is preferably a 128K board offered commercially by the E. F. Tandy Corporation, Model No. 263334, which is effective to be programmed for converting analog voltage inputs into a digital display on the monitor 23. The computer board has a alternating current power source line 101 which is connected to the alternating current junction box 26. A multi-lead grid and post connector 103 is mounted on the grid panel 95 and has a multi-lead wiring harness 104 which is connected to the computer board by way of a multi-lead connection 107. A similar multi-lead connector 110 is connected to the control panel for connection to a similar multi-lead connector 112 on the computer board by a multi-lead wiring harness 114. A standard coaxial video cable 116 is connected between the video input connection 24 on the monitor and a video output 117 on the computer board 100.

INDUSTRIAL APPLICABILITY

The indoor horseshoe pitching game of the present invention is intended to be played by either two opposing players or four players as two teams which are divided into a red team and a blue team. When the alternating current junction box 26 is plugged into a suitable source of alternating current, the electronic system of the console 10 is placed in the "power on" mode as depicted by the first panel 120 in FIG. 9. The computer board 100 converts the AC current to a relatively low voltage (0.3–5 v) direct current to the sensor panel 95 and to the control panel 27 through the wiring harnesses 104 and 114, respectively. The computer board is also programmed to immediately place the system in the "demonstration mode" of panel 121, unless such mode is interrupted by a "service check interrupt" shown by the panel 122. A service check is imposed by the provision of a normally closed switch button disposed within the television monitor cabinet 14, not shown, to permit a service technician to check all the computer board functions at any time.

Assuming all systems are operating properly, the multicolor monitor screen will display a series of colored graphics with preliminary instructions for initiating the playing of the game as depicted in panel 123. During this mode the computer board continually checks the coin slot, as shown in panel 124, and if any coins have been deposited in an amount necessary to initiate the system, the begin game mode panel 126 is actuated to light the console front panel 15 to illuminate the red leg 20 of the horseshoe design 18 which red team always goes first as depicted by the panel 128. At the same time, the number of games corresponding to the amount of money introduced into the coin slot is credited on the screen of the monitor as shown by panel 129 and the game rules are simultaneously displayed as by panel 130.

In addition to regular horsehoses, which is won by the first player reaching the score of 21, a multiplicity of additional methods of scoring or other game variations can be devised which are successively displayed on the monitor screen by manually pushing the "select" button 34 on the control panel. This is controlled by the check "start" panel 132 during which time the computer board will continue to scan the circuit to determine if the "select" button has been pushed. When the select button is pushed as depicted by panel 134, the computer will automatically advance the program to the next game option as shown in panel 135. The monitor will then display that option as shown in panel 136, consisting of the rules for the next alternative game. When the start button 32, associated with the check start panel 132, is actuated, the circuit will go into the play mode of panel 140 in order to begin play of the selected game whose rules were displayed on the monitor screen when the start button was pushed.

The computer board 100 then selects the appropriate "load score formula" of panel 141 and resets the score in panel 142 while displaying appropriate graphics of panel 144 and resets such graphics as in panel 147 prior to the beginning of play. Also during this time, the computer checks the grid as in panel 148 and, if necessary, resets the grid as in panel 149 to make certain that the game can proceed. A final grid check is then made as in panel 150 and if the computer senses a shoe 75 or other obstruction in the pit 40, the monitor will immediately display the "pickup" command of panel 151 and such obstruction will need to be removed by the players before play can resume. If no obstruction or shoe is found on the pit floor, the monitor will graphically display the "toss" command of panel 153 instructing the first player to toss the first shoe into the pit 40.

When a shoe 75 lands upon the floor of the pit 40, the sensors within the sensor panel beneath the floor will be activated by the magnets closing the sensor switches 99 immediately below the shoe. This activates the grid as depicted by the panel 155 of FIG. 10 by way of the wiring harness 104 and connectors 103 and 107 between the grid and the computer board 100. There is then a three-second timer count as shown by the panel 156 during which time the word "wait" of panel 157 is displayed on the monitor screen. The computer then calculates the shoe location as in panel 158 and assigns a score value as in panel 160 and such value is stored in the computer memory as in panel 161. The command word "toss" will then be redisplayed on the monitor screen instructing the player to toss the second shoe as depicted by the panel 162 which again activates the grid as depicted in panel 155 by way of the flow chart line 164. The above-described sequence is then repeated and after the second toss the command "pickup" of panel 165 is displayed on the monitor screen. The computer then combines the two toss scores as depicted in panel 167 and the total score is displayed on the monitor screen as indicated in panel 170.

If at this time there is any argument between the players as to the correct score being displayed, a manual score correction system is provided. Such system is activated by a player holding in either the "red" or "blue" score correction buttons 36 or 37 while manually pushing the "plus" or "minus" buttons 38 or 39 to appropriately raise or lower the score as displayed by the monitor. This is depicted in panels 172 and 173 until the correct score is established. It should be noted, however, that such correction can only be done once per player in any one game and then only within a three-point limit or spread. This prevents any cheating or improper use of the score correction feature, particularly any attempts to revert a nearly finished game back near the start. The game then proceeds by repeating the above-described sequence of events commencing with successive "grid checks" of panel 150 of FIG. 9 until the score or game point is achieved by one of the players or teams as shown in panel 175 at which time the word "winner" of panel 176 will be displayed on the monitor screen.

It is significant that no matter where a player's shoe lands on the floor of the pit 40, an appropriate score will be calculated and displayed by the monitor screen. If a player's shoe lands in encircling relation about the goal post 60, as shown by the phantom line positions of the shoes 75 in FIG. 8, the two lowermost sensor switches 90 and 91 will be activated by the magnets 78 within the shoe to record a score of "3" for the ringer. A double ringer is also shown in FIG. 8 during which time the third sensor switch 92 is also activated along with sensors 90 and 91 which is read by the computer to provide s score of "6" points or the highest that can be achieved in any one turn during the game. A leaner which results in a score of "2" is achieved by activation of the uppermost sensor switch 93 in combination with switches 91 and 92. If a shoe lands on the floor of the pit anywhere within the scoring circle 57, a score of "1" will be displayed by the computer screen. Any shoe landing anywhere outside of the scoring circle will not receive any points and a "0" will be displayed by the monitor screen. It should be noted that only the location of the shoe when it finally comes to rest upon the floor of the pit is effective to trigger any of the sensors and provide a score to the player throwing the shoe. This is assured by the three second delay of panel 156 of FIG. 10 which provides time for the shoe to settle into its final at rest position on the floor of the pit. Therefore, even if a shoe is thrown and deflected off of the back wall 43, and finally comes to rest around the goal post, it will be counted as a ringer.

From the foregoing it is readily apparent that the indoor horseshoe pitching game of the present invention successfully simulates the popular outdoor horseshoe pitching game, both structurally and in the manner in which the game is played. The walled pit area makes it possible to safely play the game indoors without the usual hazards attendant to the outdoor game by confining the thrown horseshoes to the immediate pit area. The electronic system, including the computer board, rigidly controls all aspects of the game, including the immediate determination of the precise positioning and location of thrown shoes on the floor of the pit and the conversion of such location to the calculation and display of an accurate score for each of such tosses. Upon any disagreement between the players, the scores can be manually corrected or play may be interrupted for a service check of all the electronic systems if some malfunction occurs.

We claim:

1. An indoor horseshoe pitching game comprising;
   at least one horseshoe-shaped projectile adapted to be thrown through the air;
   a projectile receiving pit haivng a plurality of peripherally upstanding side walls;
   a target post centrally located within said pit in substantially upright vertically extended position;
   and electronic scoring display means located adjacent to said pit indicating the positions of projectiles landing within the pit relative to said target post; said electronic scoring display means including a programmable computer board;
   a television monitor electrically connected to said computer board;
   a plurality of electrical sensors mounted in said target post and said pit electrically connected to said computer board;
   and sensor activating means disposed in said projectile for energizing and appropriate signal to said computer board indicating the precise location of a projectile landing within the pit and its relative position with respect to said target post with a visual display to the scoring being projected on said monitor corresponding to such location of the projectile.

2. The indoor horseshoe pitching game of claim 1 in which said sensors in said target post are arranged in longitudinally spaced relation for indicating a ringer or double ringer of projectiles about the base of the post or a leaner with only a portion of the projectile contacting the outer surface of the post a predetermined distance upwardly from the base.

3. The indoor horseshoe pitching game of claim 2 wherein said sensors in the pit are arranged in a grid pattern for indicating the location of a projectile coming to rest within a projectile width of the target post.

4. The indoor horseshoe pitching game of claim 3 wherein said sensor activating means in said projectile are a plurality of magnets.

5. The horseshoe pitching game of claim 4 in which said horseshoe-shaped projectile has a pair of spaced substantially parallel legs interconnected by a bight portion, and a plurality of sets of pairs of said magnets being disposed in said legs and said bight portion of the projectile.

6. The horseshoe pitching game of claim 5 in which each magnet is constructed of an elongated relatively flat strip of magnetic material having oppositely polarized north and south planar surfaces with each pair disposed within the projectile in relatively closely spaced substantially parallel relation to each other with the south planar surface of one lying adjacent to the north planar surface of the other to generate a uniformly perpendicularly outwardly extending magnetic field from either side of the projectile.

7. The horseshoe pitching game of claim 6 including a manually actuatable control panel electrically connected to said computer board having a pair of buttons for selectively raising or lowering the score displayed on the monitor if upon visual inspection of a particular position of a projectile on the pit floor an incorrect score has been computed and displayed.

8. The horseshoe pitching game of claim 7 wherein said control panel further includes at least one coin slot, a "start" button, and a "select" button all electrically connected to said computer board for selecting and initiating one of a plurality of modes of play.

9. A system for controlling an indoor horseshoe pitching game having a target console providing a shoe receiving pit with a goal post, and at least one horseshoe-shaped projectile adapted to be thrown at such post comprising;
   an electronic circuit providing a computer board having a plurality of external sensors connected thereto, and a television monitor connected to said computer board for selectively displaying a set of visual commands to the players and a running score relating to the positions of projectiles landing in said pit relative to said post; said electronic circuit further includes a plurality of manual controls on said console connected to said computer board comprising;
   a normally open coin slot switch button;
   a normally open game "select" switch button;
   a normally open game "start" switch button;
   a pair of normally open player identifying switch buttons;
   and a pair of "plus" or "minus" switch buttons for selectively correcting a score on the monitor either upwardly to increase the score or downwardly to reduce the score shown on the monitor.

10. The system of claim 9 in which said computer board is programmed for running the monitor in a "demonstration mode" until said coin slot switch is actuated by the insertion of an appropriate number of coins therein which places the system in a "begin game" mode said computer board further comprising; means for;
    displaying the game rules of one of several games on said monitor while crediting the appropriate number of games to be played corresponding to the number of coins inserted;
    means for checking the "start" and "select" buttons, and successively displaying the rules of several optional games upon manual actuation of the "select" button and reacting to the pressing of the "start" button as a indicator that one of said optional games has been selected;
    means for loading the appropriate scoring formula into the system corresponding to the selected game option and resetting any graphic displays from the monitor and generally clearing all circuits for the newly selected game;
    means for checking the pit sensors for any shoes remaining thereon from the preceding game or other undesirable obstructions, debris or the like and if any are present, displaying a "pick-up" command on the monitor or if none are present, displaying a "toss" command to the first player;
    means for activating and receiving a signal from the sensors in the pit upon the receipt of a shoe therein;
    means for imposing three-second delay to assure that the shoe has reached a final at rest position while displaying a "wait" command on the monitor;
    means for calculating the shoe location and assigning it in appropriate score value and storing such value in memory until after a second shoe has been tossed;
    means for displaying the "toss" command for the second shoe;

means for displaying the "pick-up" command after the second shoe has been received and calculated, and totalling and displaying the total score of the two tosses;

means for maintaining a running total of successive tosses until one player achieves a score equal to a predetermined "game point" ending play;

and declaring means for declaring one of said players the "winner" by a corresponding graphic display on the monitor.

* * * * *